Aug. 3, 1965  E. A. WEILMUENSTER ETAL  3,198,838
PRODUCTION OF LIQUID BOROHYDROCARBONS
Filed Oct. 12, 1955  5 Sheets-Sheet 1
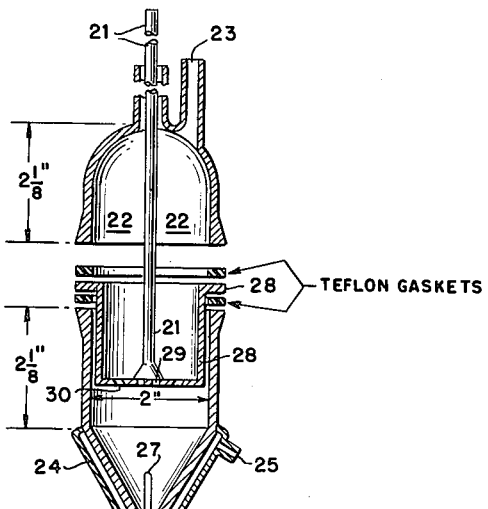
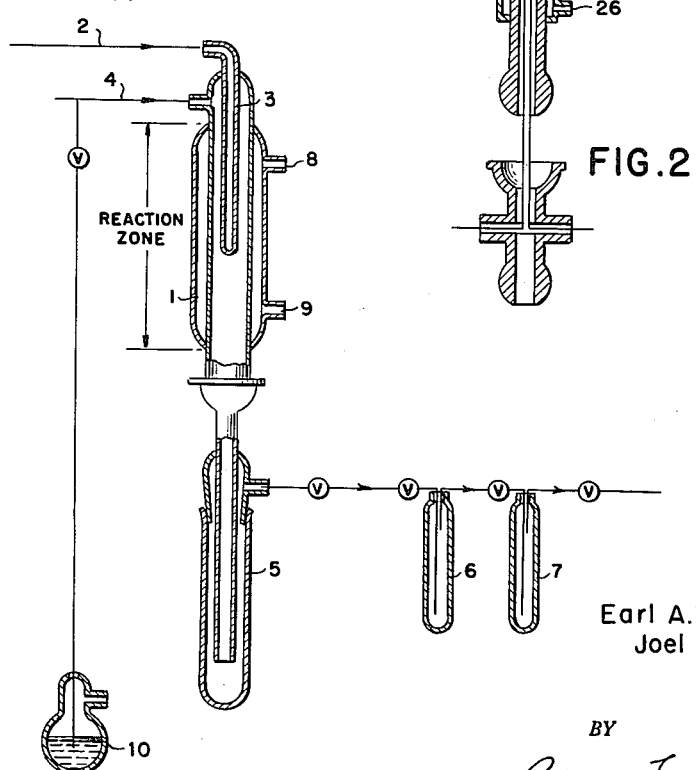
Earl A. Weilmuenster
Joel A. Zaslowsky
INVENTORS
BY
*Adams, Forward and McLean*
ATTORNEYS Aug. 3, 1965  E. A. WEILMUENSTER ETAL  3,198,838
PRODUCTION OF LIQUID BOROHYDROCARBONS
Filed Oct. 12, 1955  5 Sheets-Sheet 2

Earl A. Weilmuenster
Joel A. Zaslowsky
INVENTORS

BY
Adams, Forward and McLean
ATTORNEYS

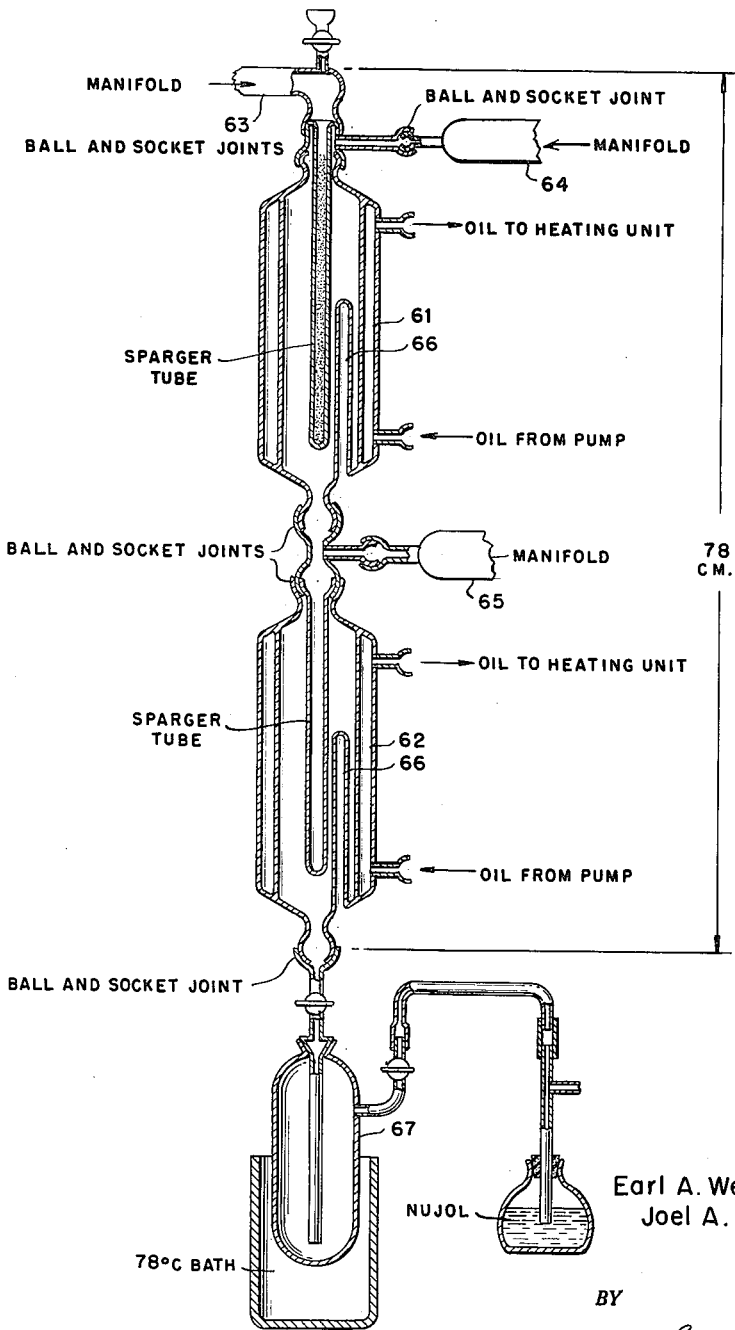

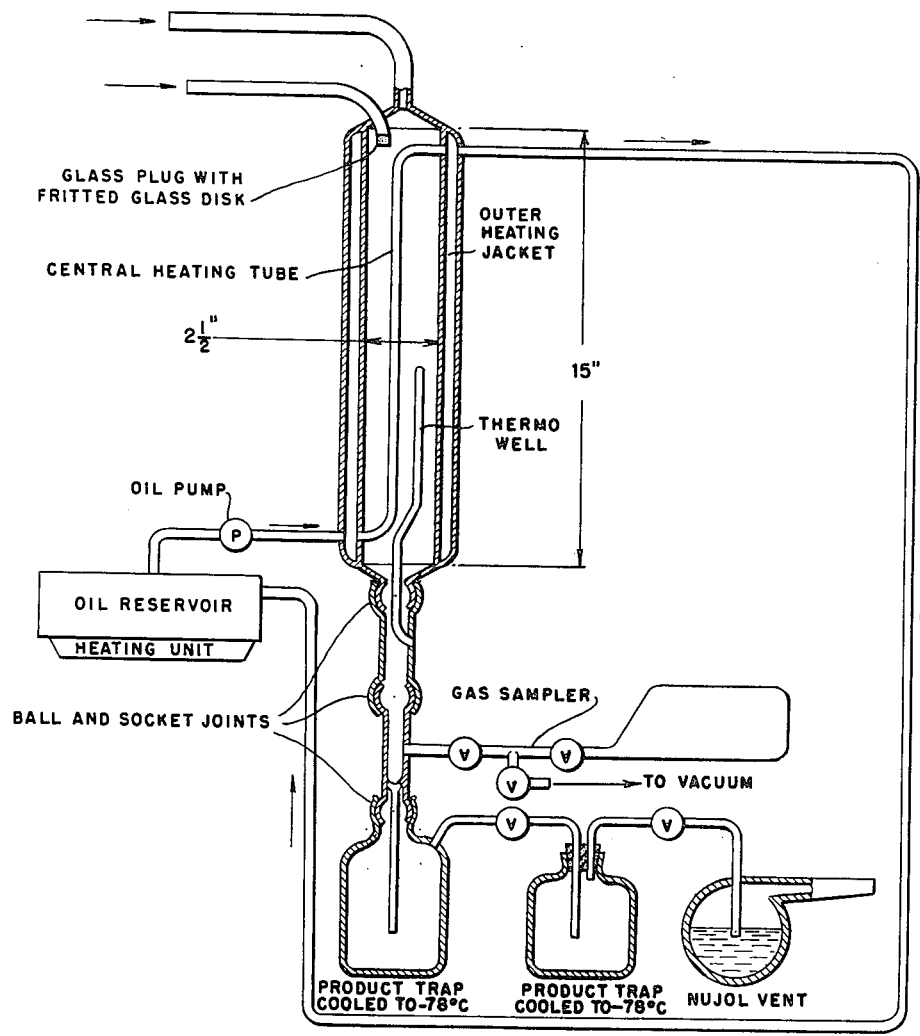

United States Patent Office 3,198,838
Patented Aug. 3, 1965

3,198,838
PRODUCTION OF LIQUID BOROHYDROCARBONS
Earl A. Weilmuenster, Kenmore, and Joel A. Zaslowsky, Niagara Falls, N.Y., assignors, by mesne assignments, to Olin Mathieson Chemical Corporation, a corporation of Virginia
Filed Oct. 12, 1955, Ser. No. 540,140
7 Claims. (Cl. 260—606.5)

This invention relates to a method for the production of liquid borohydrocarbons by reacting diborane with ethylene or propylene or a mixture of ethylene and propylene. The liquid borohydrocarbons produced are useful as fuels.

Although the reaction of diborane with various hydrocarbons has been proposed and attempted previously, only a very limited amount of work concerning this reaction has been published. In general, diborane does not react well with saturated hydrocarbons while the reaction of diborane with unsaturated hydrocarbons such as ethylene frequently results in a violently exothermic reaction resulting in the decomposition of liquid products to form gases and solid products. Hurd (J.A.C.S.) 70, pages 2053–5, was able to cause diborane and hydrocarbons to react in a controlled manner by mixing small amounts of diborane with ethylene, for example, at liquid air temperatures and allowing the mixture to warm up gradually under pressure in sealed reaction tubes. When ethylene was used, the resulting product contained large amounts of triethylboron but no volatile ethyl diborane compounds. The product was low in boron content and hence also in energy value, so that it was not well adapted for use as a high energy fuel.

Figure 5:
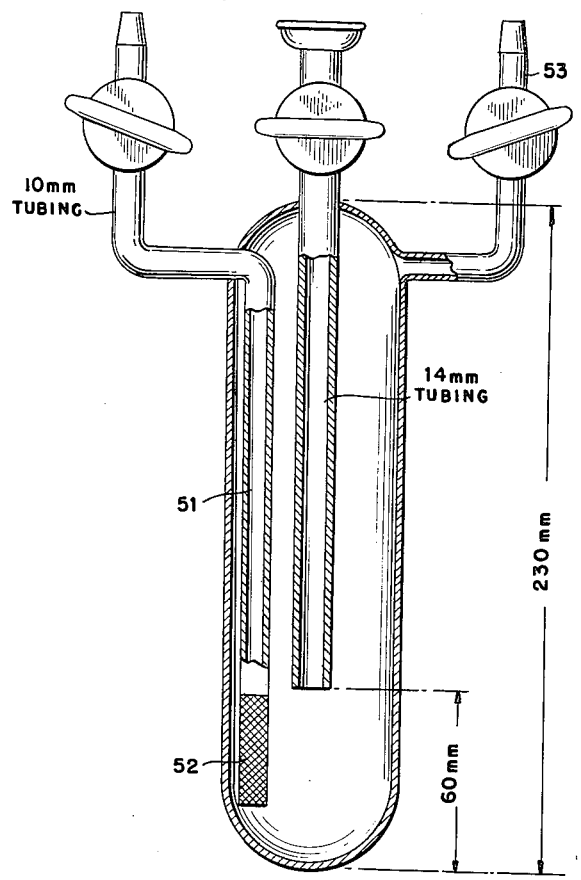

The present invention will be described in connection with the drawings in which each of FIGS. 1 to 4, 6 and 7 illustrate reactors employed in different experiments and FIG. 5 illustrates a trap usable therewith.

In accordance with the present invention, a method has been devised whereby diborane and ethylene or propylene or mixtures thereof can be reacted smoothly to produce liquid borohydrocarbons which are of relatively high boron content and hence well adapted for use as a high energy fuel. This is accomplished in accordance with the present invention by reacting the olefin or mixture of olefins and the diborane at a temperature of 130 to 300° C., preferably 150 to 250° C., in the vapor phase while the reactants are in admixture with an inert diluent gas, such as hydrogen nitrogen, argon or mixtures thereof. The molar ratio of olefin to diborane introduced into the reaction zone is within the range 1:10 to 10:1, preferably 1:8 to 1:2, and the diluent gas comprises from 5 to 95 percent by volume, preferably 20 to 60 percent by volume, of the total mixture of gases introduced into the reaction zone. If desired, a portion, generally up to 60 percent on a volume basis, of the olefin introduced into the reaction zone can be replaced by acetylene.

When the diborane and olefin are reacted in the manner just described, the two spontaneously react upon admixture under the condition of elevated temperature. The gases can be separately preheated and introduced into the reaction zone maintained at a controlled elevated temperature, or the cooled gases can be introduced as such to the reaction zone whereupon a short induction period, depending upon the temperature, usually is observed before reaction takes place. The reaction is exothermic, and therefore once initiated is self-sustaining. Depending upon the size and design of the reactor, the voulme of the reactants, and the quantity of diluent gas, it is at times desirable to provide means for cooling the reaction zone in order to control the temperature. The relative proportion of each gas in the reaction mixture can be varied widely and the nature of the product controlled to a significant extent in this manner.

The reaction products are chiefly liquids of low vapor pressure. Separation of the products from the reactor effluent can be accomplished by cooling or by extraction with a suitable solvent such as the liquid obtained as a product from the reaction. Small amounts of solids formed can be removed from the liquid products by filtration or from the reactor gas stream by means of a cyclone separator. The remaining gas stream consisting of the diluent gas and a small amount of olefin and diborane can be compressed and recycled to the reactor. The desired amounts of make-up olefin and diborane then can be added to maintain proper feed compositions.

The following examples illustrates various embodiments falling within the scope of this invention and are to be considered not limitative.

EXAMPLE I

In this experiment, the reaction of ethylene and diborane was conducted in a single inlet reactor 1 as shown in FIG. 1. Ethylene diluted with hydrogen was passed through line 2 and into the reaction zone through central inlet tube 3. Diborane, diluted with hydrogen, was let into the reactor through line 4. The stream containing the ethylene was discharged at the end of the glass inlet tube through four holes each having a diameter of 1 mm. The inlet tube was situated so that the outlet holes were 100 mm. from the bottom of the reaction zone. The stream containing the diborane was passed down the annular space. Reactor effluent was passed through traps 5, 6 and 7 connected in series. Trap 5 was maintained at room temperature in order to collect any solids formed. Traps 6 and 7 were maintained at −196° C. The reaction zone, which was 300 mm. long, was heated by circulating hot oil through the reactor jacket by means of lines 8 and 9. Mercury-sealed vent 10 was provided as a safety means. Thermocouple (not shown) placed in a glass well about ½ inch below the lower end of the inlet tube measured the temperature inside the reactor.

In this experiment the reactor was assembled and heated to 180° C. by means of the circulating hot oil stream. The flow of ethylene at the rate of 27 ml. per minute at S.T.P. and hydrogen at the rate of 213 ml. per minute at S.T.P. to the central inlet tube was begun, followed by the flow of hydrogen at the rate of 53 ml. per minute at S.T.P. and diborane at the rate of 187 ml. per minute at S.T.P., to the annular section of the reactor. After one minute a dense white smoke was observed in the trap below the reactor. After 22 minutes of reaction time gases began to escape through the mercury safety vent indicating that the traps had become clogged and the reaction was stopped. Trap 5 was allowed to warm slowly which allowed the product to melt and collect in the bottom of the trap. Then the trap was recooled to −196° C. and the reaction was resumed. After 18 additional minutes the reaction was stopped once more to melt the product which obstructed the opening in the trap. The reaction was reinitiated and after 4 minutes the flow of gases was halted due to the formation of solids below the reactor. During the reaction time of 42 minutes the temperature varied between 176° and 185° C.

The volatile components of the liquid product obtained from this reaction were removed at −196° C. with a vacuum pump until the vapor pressure of the remaining liquid was less than 5 mm. of mercury. The liquid product was allowed to warm to −78° C. and the volatile components at this temperature were removed in the same manner. The remaining liquid product was placed in a bath cooled to 0° C. and was found to have an initial vapor pressure of 42 mm. The volatile components were removed until this vapor pressure had been reduced to 5 mm. at 0° C. The resulting liquid product weighed 0.26 g. This sample, after being brought to atmospheric pressure by the addition of nitrogen to the system, was shown by analysis to contain 52.4 percent boron.

EXAMPLE II

The reactor used was the single inlet reactor shown in FIG. 1. In this experiment the reactor was assembled and heated to 180° C. by means of the circulating hot stream of oil which was sent through the jacket of the reactor. The flow of ethylene and hydrogen at the rate of 22 ml. per minute at S.T.P. and 177 ml. per minute at S.T.P., respectively, was begun followed by introduction of the diborane and hydrogen at the rate of 221 ml. per minute at S.T.P. and 44 ml. per minute, respectively. After one minute a dense white fog was observed in the trap below the reactor. After 17 minutes of reaction time the cold trap 6 became clogged with solids and the gases began to escape through the mercury safety vent (bubble-off); the reaction was stopped. The trap was allowed to warm slowly in order to melt the product which had clogged the inner tube of the trap. The melted product was collected in the bottom of the trap, and when open, the trap was again cooled to −196° C. One minute after the reaction was resumed, a dense white fog was observed in the trap 5 below the reactor. After 20 minutes the temperature increased suddenly to 190° C. but dropped back to 180° during the next 3 minutes after which is fluctuated between 177° C. and 185° C. for the remainder of the reaction period. After 67 minutes the reaction was stopped in order to melt the product clogging the opening in the trap. After the product had melted and collected at the bottom of the trap, the opening remained clogged with the liquid product and the reaction was terminated. The total reaction time was 67 minutes and during this interval the temperature varied between 177° and 190° C.

The volatile components of the liquid product obtained from this reaction were removed by pumping at −196° C. until the vapor pressure of the remaining liquid was less than 5 mm. The liquid product was allowed to warm to −178° C. and the volatile components at this temperature were removed in the same manner. The remaining liquid then was placed in a bath cooled to 0° C. and was found to have an initial vapor pressure of more than 240 mm. Again the volatile components were removed until the vapor pressure of this material was reduced to 9 mm. at 0° C. The remaining liquid product which weighed 0.6 g. was brought to atmospheric pressure by the addition of nitrogen to the system. Anaylsis of the liquid indicated that it contained 64.6 percent boron. Mass spectrographic analysis showed the presence of pentaborane and a small amount of ethyl pentaborane-9 in the liquid product.

EXAMPLE III

The reactor utilized in this experiment was the single inlet reactor described in FIG. 1. The inlet tube for ethylene in this case extended 50 mm. down the reaction zone.

The reactor was heated to 200° C. by means of the circulating hot oil stream which was passed through the jacket of the reactor. The flow of ethylene and hydrogen at the rate of 40 ml. per minute at S.T.P. and 320 ml. per minute at S.T.P., respectively, was begun followed by the introduction of the hydrogen and diborane at the rate of 80 ml. per minute at S.T.P. and 400 ml. per minute at S.T.P., respectively. After 8 minutes the temperature was reduced to 190° C. because of the excessive formation of solids. The experiment was continued for at total of 60 minutes during which time the products were condensed in the two traps held at −196° C. The volatile components of the products were removed by pumping with a vacuum pump until the resultant liquid product had a vapor pressure of 6 mm. at 0° C. Mass spectrometric analysis of resulting liquid having a vapor pressure of 6 mm. at 0° C. indicated that it was a 3:1 mixture of ethylpentaborane to pentaborane.

EXAMPLE IV

In this experiment, a 2-inch conical reactor shown in disassembled form in FIG. 2 was employed. Diborane and hydrogen were mixed together and passed into the center inlet 21 of the reactor, while ethylene and hydrogen were mixed and passed into the outer zone 22 by means of line 23. The reactor was equipped with a jacketed section 24 which was heated with hot Dow-Corning 550 silicone oil circulated by means of lines 25 and 26 using a centrifugal pump (not shown). The temperature in the reaction zone was measured by a thermocouple 27. The reactor was provided with reactor plate 28 which was drilled with three 0.0400 inch holes 29 on a ¼ inch radius measured from the axis of the reactor and with four 0.0135 inch holes 30 on a ⅝ inch radius measured from the axis of the reactor, those four holes facing inwardly in a downward direction at an angle of 15° from the vertical. The three holes on the ¼ inch radius served to admit the mixture of diborane and hydrogen into the lower portion of the reactor and the four holes served to admit the mixture of ethylene and hydrogen into the same space. A trap maintained at room temperature was placed below the reactor to collect any solids carried by the reactor effluent, and from that trap uncondensed gases were passed in series flow successively through two traps cooled to −78° C., a trap cooled to −130° C., and finally through a trap cooled to −196° C.

The reactor was assembled and heated to 205° C. by circulation of a stream of hot silicone oil through the reactor jacket. The whole system was evacuated and flushed with nitrogen. Ethylene, at the rate of 15 ml. per minute at S.T.P. and hydrogen at the rate of 45 ml. per minute at S.T.P. were mixed together and passed into the reactor. Next, diborane, at the rate of 135 ml. per minute at S.T.P., and hydrogen, at the rate of 15 ml. per minute at S.T.P., were mixed together and passed into the reactor. After one minute a dense white fog was visible in the trap below the reactor. As the reaction progressed moderate quantities of white solids collected above and below the heated zone and turned yellow after about 15 minutes. After a reaction time of 60 minutes the ethylene and diborane were turned off and nitrogen was swept through the system for several minutes. The gaseous and finely dispersed products were condensed in the two traps cooled to −78° C. The residence time for this particular reaction was 7 seconds.

An infrared analysis of the liquid condensing in the traps cooled to −78° C. showed the most volatile material to be mainly monoethyldiborane with a small amount of free diborane. The next material vaporized was found to be a mixture of pentaborane and ethyldiboranes. The material having a vapor pressure of 10 mm. at 10° C. was shown to be a mixture of ethylpentaborane, pentaborane and ethyldiboranes. The yield of liquid product with a vapor pressure of less than 10 mm. at 10° C. based on the diborane input was 4.1% and the percent boron in this product was 59.3.

EXAMPLE V

Addition of catalytic amounts of boron trifluoride when used in conjunction with reactions carried out in the reactor of FIG. 1 was found to suppress the formation of solids during the reaction of ethylene and diborane, thus permitting the continuation of the reaction for longer periods of time. In this experiment, as in previous examples, the hydrogen and unsaturated hydrocarbons were mixed together and passed through a single feed line into the central inlet tube of the reactor. Diborane and hydrogen were mixed together and passed through a single feed line into the annular section of the reactor. The boron trifluoride catalyst was added to the reaction in the hydrogen-diborane feed line. The stream containing the ethylene was discharged at the end of a central glass inlet tube through four holes each having a diameter of 1 mm. The end of this tube was placed at a position 150 mm. from the top of the reaction zone which was 300 mm. long. The stream containing the diborane was passed down through the annular space. The temperature inside the reactor, which was heated by a circulating hot oil stream, was measured by a thermocouple located in a glass well about 50 mm. from the bottom of the reactor. A trap below the reactor was kept at room temperature to collect any solids formed. Two traps arranged in series and cooled to −196° C. were used to collect the products.

In this experiment the reactor was assembled and heated to 179° C. Ethylene at the rate of 22 ml. per minute at S.T.P. and hydrogen at the rate of 177 ml. per minute at S.T.P. were mixed together and passed into the heated reaction zone through the central inlet tube. Next, diborane at the rate of 221 ml. at S.T.P. and hydrogen at the rate of 44 ml. per minute at S.T.P. were mixed together and passed into the annular space of the heated reaction zone. 10 ml. per minute of boron trifluoride at S.T.P. was added with the diborane-hydrogen mixture.

In about one minute a dense white fog was observed in the trap below the reactor. After approximately two minutes, crystals of decaborane were observed in the trap below the reactor. The temperature fluctuated between 179° C. and 183° C. during the reaction period. After 116 minutes of reaction time the gases began to escape through the mercury safety vent (bubble-off) and the reaction was stopped. The trap cooled to −196° C. was allowed to warm slowly to room temperature in order to melt the product which clogged the inner tube of the trap. The melted material was allowed to flow, by gravity, to the bottom of the trap after which the trap again was cooled to −196° C. One minute after the reaction was resumed a dense white fog was observed in the trap below the reactor. The reaction was stopped after an additional 9 minutes when gases again began to escape through the mercury escape vent. The liquid product collected in the trap cooled to −196° C. was allowed to warm to room temperature overnight while the volatile gases were allowed to escape through a Nujol-sealed gas vent (bubble-off).

Crystals of decaborane and yellow solids which clogged the narrow neck of the trap below the reactor were removed as completely as possible and the reaction was resumed. A dense white fog appeared again after one minute and the reaction was continued for an additional 40 minutes. After a total reaction time of 2 hours and 45 minutes the experiment was terminated when gases again began to escape through the mercury vent. The liquid product obtained from the reaction was allowed to warm to room temperature during which time the volatile components of the liquid product were allowed to escape through the mercury safety vent. The liquid product that remained weighed 0.34 g. which corresponds to a 21.4 percent yield based on the diborane input. It contained 69.6 (69.3, 69.8) percent boron and 0.21 (0.24, 0.17) percent fluorine. The volatile components of this crude liquid residue were transferred under reduced pressure to a trap cooled to −195° C., and maintained under reduced pressure until the vapor pressure of the liquid product was reduced to less than 10 mm. at 0° C. The 1.80 g. of liquid residue which remained represented a 4.3 percent yield based on the total diborane input.

The residence time employed in this reaction was 17 seconds. The yield of crude product, based on the weight of diborane used, was 21 percent.

EXAMPLE VI

The reaction of diborane and ethylene was carried out in the two-inch conical reactor (FIG. 2) in the presence of a specially prepared catalyst. As a first step in the preparation of the catalyst, about 30 g. of 4 mm. Berl saddles made of glass was placed in 50 milliliters of 5 to 10 percent silver nitrate solution and the solution boiled gently for 5 minutes and then allowed to cool to room temperature. The excess solution was removed by decantation. In the next step 50 milliliters of 5 percent sodium hydroxide was added to the Berl saddles and the mixture was boiled for 5 minutes, after which the saddles were washed with water, care being taken to retain as much of the precipitated silver oxide as possible. The coated Berl saddles were dried and then placed in an oven at 500° C. for one hour in order to decompose the silver oxide to metallic silver.

In this reaction a mixture of diborane and hydrogen was fed in through the center holes of the diffuser plate and a mixture of hydrogen and ethylene was fed in through the outer ring of holes in the diffuser plate. The temperature in the center of the reactor was measured by means of a thermocouple. Two traps, cooled to −78° C., were used to collect the products. In this experiment the lower third of the conical reactor was packed with the silver on Berl saddles catalyst which were prepared as described.

The reactor was brought to a temperature of 215° C. by circulating hot oil through the reactor jacket. Ethylene and hydrogen were individually metered and then mixed together and introduced into the reaction zone through the outer ring of holes in the diffuser plate at the rates of 15 and 90 cc. per minute at S.T.P., respectively. Next, diborane and hydrogen were introduced into the reaction zone through the center holes in the diffuser plate at rates of 135 and 45 cc. per minute at S.T.P. respectively. After 2 minutes a white fog was observed in the trap below the conical reactor. During the course of the reaction, which was of one hour duration, the reaction temperature, as measured by the thermocouple, rose from 215° C. to 235° C. Very little solids were observed during the course of this reaction. The residence time for this reaction was 5.0 seconds.

The product collected in the two traps was allowed to degas at room temperature overnight through a mercury vent. The material was transferred under vacuum to a receiving bulb attached to a high vacuum line. This crude product was pumped on at 0° C. until the vapor pressure was 10 mm. of mercury. The low volatile material, which weighed 0.33 g., was shown by infrared analysis to contain pentaborane structures, carbon-hydrogen structures and possibly some ethyldiboranes and by chemical analysis the boron content was shown to be about 63 percent. Based on the diborane input the yield was 3.31 percent.

EXAMPLE VII

In this experiment the two-inch conical reactor (FIG. 2) was filled with Berl saddles and heated to 235° C. Ethylene at the rate of 15 ml. per minute at S.T.P., and hydrogen at the rate of 45 ml. per minute at S.T.P. were metered through individual rotameters, mixed together, and passed into the reactor through the central inlet tube. Diborane at the rate of 135 ml. per minute at S.T.P. and hydrogen at the rate of 15 ml. per minute at S.T.P. were measured by individual rotameters, mixed together and passed into the annular space of the reactor. After two minutes a white fog was observed in the trap below the reactor; after five minutes a viscous yellow liquid was observed at the bottom of the reactor. The temperature fluctuated between 234 and 237° C. during the experiment which was terminated after one hour. Reactor effluent was passed through three traps in series, the first being maintained at room temperature while the second and third were cooled to −78° C.

The liquid obtained in the traps cooled to −78° C. was allowed to warm to room temperature and the volatile gases allowed to escape through a mercury safety vent. A 28.4 percent yield of crude liquid product containing 52.2 (52.3, 52.1) percent boron was obtained. By transferring the volatile components of this crude product under vacuum to a trap cooled to −196° C., the vapor pressure of this liquid was reduced to less than 10 mm. at 0° C. A 4 percent yield of the remaining low volatile liquid containing 41.6 percent boron was obtained. A mass spectrographic analysis of this liquid indicated the presence of pentaborane and ethylpentaborane.

EXAMPLE VIII

The single inlet reactor of FIG. 1 was heated to a temperature of 180° C. by a circulating stream of hot oil. Hydrogen at the rate of 44 ml. per minute at S.T.P., and diborane at the rate of 221 ml. per minute at S.T.P., were measured through individual rotameters, mixed together and passed into the annular space of the single inlet reactor. Then hydrogen, at the rate of 170 ml. per minute at S.T.P., and ethylene, at the rate of 22 ml. per minute at S.T.P., were measured through individual rotameters, mixed together, and passed into the reaction zone through the central inlet tube. Next, carbon monoxide at the rate of 10 ml. per minute at S.T.P. was introduced into the reaction zone through the diborane-hydrogen inlet line. The residence time for this reaction was 17 seconds. Two traps cooled to −196° C. were utilized to condense and collect the products. The reaction was continued for a period of 97 minutes and at the end of that time 5.21 g. of crude product had collected in the −196° C. traps. During the experiment the reactor temperature varied between 180 and 189° C. This material had a boron content of 66.4 percent as shown by analysis. The yield of crude product was 19.7 percent based upon the weight of the diborane consumed.

The products of the reaction were allowed to remain at room temperature overnight during which time volatile gases were allowed to escape through a mercury-sealed safety vent. Volatile components of this crude product were removed by pumping until the vapor pressure of the remaining liquid was less than 10 mm. at 0° C. The yield of low volatile product in this experiment was 3 percent which, by analysis, was shown to contain 41.5 percent boron. Mass spectrographic analysis of the low volatile products showed that it contained ethylpentaborane, ethyldiboranes and pentaborane, along with a trace of diethylborane.

EXAMPLE IX

This experiment utilized the single-inlet reactor described in Example I (see FIG. 1). The reactor was heated to 179° C. by means of a hot oil stream circulated througfh the reactor jacket. Hydrogen, at the rate of 44 ml. per minute at S.T.P., and diborane, at the rate of 221 ml. per minute at S.T.P., were measured through individual rotameters, mixed together, and passed into the annular section of the reactor. Next, hydrogen, at the rate of 177 ml. per minute at S.T.P., and ethylene, at the rate of 22 ml. per minute at S.T.P., were measured through individual rotameters, mixed together, and passed into the reaction zone through a single central inlet tube. Boron trifluoride was added to the ethylene-hydrogen stream at the rate of 10 ml. per minute at S.T.P. The reaction was continued for a period of 75 minutes and at the end of that time a yield of 5.26 g. of crude product was obtained. The reactor effluent was passed through two series connected traps maintained at −196° C. Based on the weight of diborane used, the yield of crude liquid product was 26 percent. By analysis the crude product was shown to contain 64.7 percent boron and 0.5 percent fluorine. The products of the reaction were allowed to remain at room temperature overnight and the volatile gases allowed to escape through a mercury-sealed safety vent. Next, the volatile components of this crude product were removed by pumping until the vapor pressure of the remaining liquid was less than 10 mm. at 0° C. The percent yield of low volatile products was 3.7 percent and the boron content was 42.8 percent. The fluorine content of the low volatile product was 2.2 percent. Mass spectrographic analysis showed that the low volatile product consisted chiefly of pentaborane and ethylpentaborane with a trace of triethylborane.

EXAMPLE X

In this experiment the two-inch conical reactor of FIG. 2 was utilized. The diborane and hydrogen streams were measured by individual rotameters, mixed together, and admitted to the reaction zone through the central inlet 21 while the hydrocarbon and the second hydrogen stream were individually measured, mixed and admitted through line 23. Reaction zone temperatures were measured with a bare-wire thermocouple extending upward into the reaction zone. The reaction zone was heated by circulating hot silicone oil through the jacket. The liquid products were collected in two series connected spiral condenser traps cooled to −78° C. and −130° C. respectively.

Diborane, at the rate of 700 cc. per minute at S.T.P., was measured by passing through a rotameter and passed into the reactor. Ethylene, at the rate of 70 ml. per minute at S.T.P., and hydrogen, at the rate of 200 ml. per minute at S.T.P., were measured in individual rotameters, mixed together, and passed into the reaction chamber. During the reaction the flow of hydrogen in the ethylene stream was gradually reduced from 200 ml. per minute to 150 ml. per minute at S.T.P. In this particular reaction a residence time of 1.9 seconds was employed. The reactor was heated to 150° C. Initially and during the course of the reaction, the temperature varied from 150°–160° C. During the experiment, which was carried out over a period of one hour and 40 minutes, 11.0 g. of stable liquid product was condensed in the two traps. Products condensed in the −78° C. trap were shown by analysis to have a boron content of 49.9 percent while the product condensed in the −130° C. trap was shown to have a boron content of 45.5 percent. Only a small amount of solids was produced during this reaction.

EXAMPLE XI

Figures 3, 4:
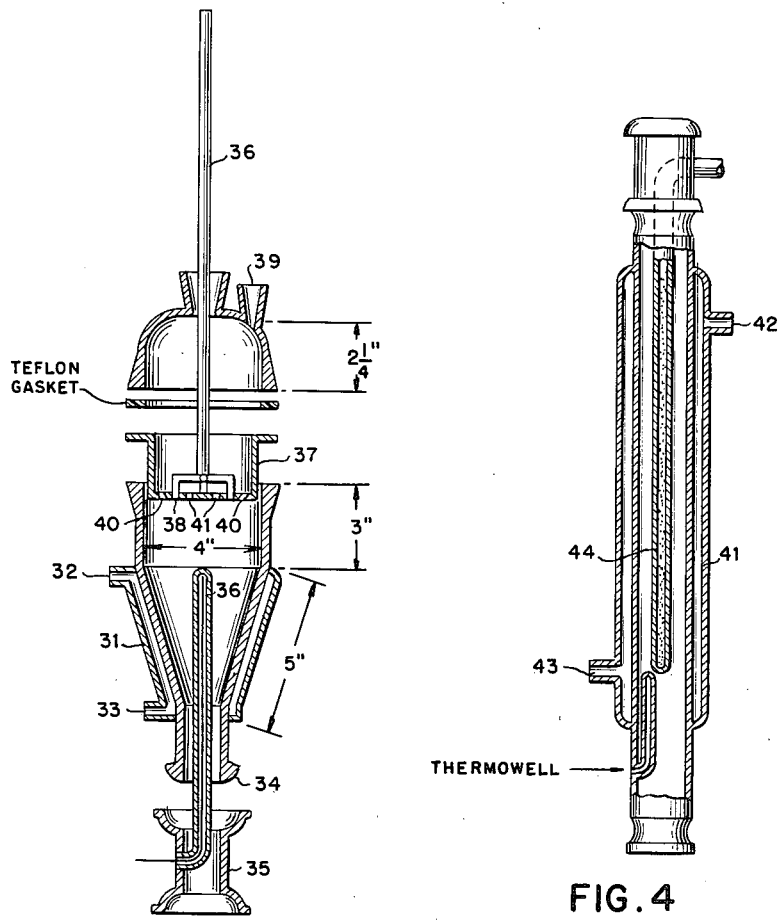

In this experiment the four-inch conical reactor shown in disassembled form in FIG. 3 was used. The reactor was drawn from a short piece of standard four inch Pyrex pipe to form a cone five inches long on the side. An external jacket 31 with suitable inlet means 32 and outlet means 33 was provided for the circulation of hot silicone oil around the lower part of the reactor. The outlet of the reactor was a 35/25 spherical glass joint 34 connected to a thermocouple bushing 35. The temperature of the reaction chamber was measured by an iron-constantan thermocouple 36. A spiral tube condenser-receiver of approximately 100 ml. capacity was attached to the thermocouple bushing. This trap was cooled to −78° C. and was followed by a second condenser-receiver cooled to −130° C. The condenser-receiver train was connected to a safety pressure release vent which was filled with silicone fluid.

In this experiment diborane at the rate of 450 cc. per minute at S.T.P. entered the reaction zone through a central tube 36 attached to the dispersing plate 37 of the reactor. This could be accomplished because plate 37 was provided with 12 holes 38 one-sixteenth inch in diameter drilled on a 1¼ inch radius from the axis of the reactor. Ethylene at the rate of 112 cc. per minute at S.T.P. and hydrogen at the rate of 672 cc. per minute at S.T.P. were mixed together and passed into the reaction chamber through inlet 39 and holes 40 and 41. There were 8 holes 41 0.0145 inch in diameter positioned on a one inch radius from the axis of the reactor and 12 holes 40, 0.0145 inch in diameter drilled on a 1⅝ inch radius from the axis of the reactor. In a downward direction, holes 40 were drilled on a 17° angle from the vertical facing inward. At the start of the experiment, the reaction temperature was 160° C. and during the reaction period varied between 160° C. and 170° C. The residence time in this particular reaction was 14.2 seconds.

During the course of the reaction 12.0 g. of stable liquid product was condensed in the two spiral condensers. The product that condensed in the trap held at −78° C. was found, by analysis, to contain 57.1 percent boron while the product condensed in the −100° C. trap was found to contain 44.2 percent boron. This reaction was continued for a period of one hour and 45 minutes during which time very little solid material was produced. Since considerable amounts of diborane were condensed in both cold traps, the weights of the liquid products were not taken until the traps had been vented overnight at room temperature under a stream of nitrogen.

EXAMPLE XII

In this experiment, ethylene and diborane were reacted in the sparger-type reactor of FIG. 4 and then, in a second step, the reaction product was reacted further with additional diborane. The reactor of FIG. 4 was provided with a hot oil jacket 41 fitted with suitable inlet means 42 and outlet means 43 for the hot oil. Sparger tube 44 was utilized for the introduction of ethylene into the reaction zone. The reactor was about 12 inches long and had an inner chamber of 30 mm. tubing with a volume of about 150 ml. The sparger tube was about 8 mm. in diameter and extended 10 inches down into the reactor. The crude product was collected in a trap maintained at −78° C.

In this experiment, diborane at the rate of 300 ml. at S.T.P. per minute and ethylene at the rate of 300 ml. at S.T.P. per minute were passed together with hydrogen at the rate of 2260 ml. at S.T.P. per minute through the hot tube reactor at a temperature of 140° C. for 90 minutes. Ethylene diluted with 3.8 times its volume of hydrogen was introduced through the central sparger tube and diborane with 3.8 times its volume of hydrogen diluent was introduced into the annular space through the single inlet 45 directly at the top of the reactor. The colorless liquid reaction product which collected at −78° C. was subjected to reduced pressure for short periods of time. Vapor pressure measurements were taken from time to time until the vapor pressure at 0° C. was approximately 42 mm. The remaining liquid weighed 17 g. and represented a 34 percent yield based upon the weight of diborane used. The crude material contained 3.9 g. of a non-volatile liquid which, by analysis, was shown to contain 17 percent boron. The molecular weight of the crude product, determined by vapor density measurement, was 83.5 (calculated 83.8 for diethyldiborane). Active hydrogen, as determined by methanolysis, was found to be 5.0 (calculated 4.0 for diethyldiborane). Active hydrogen is defined as the ratio of milliliters of hydrogen given off/milliliter of compound.

In the second step the diethyldiborane produced in the first step was reacted with additional diborane. The trap shown in FIG. 5, as well as the reactor in FIG. 4 was employed in this step. The diethyldiborane produced in the first step was passed into the trap at a controlled rate through line 51 which was provided with fitted tube 52 in order to disperse the diethyldiborane in the trap. Control of the temperature of the liquid in the trap determined the amount of diethyldiborane that the hydrogen would carry with it into the reactor of FIG. 4 through line 53. The mixture passing through line 53 of FIG. 5 was introduced into the sparger tube 44 of FIG. 4. Conditions were adjusted such that diborane at the rate of 100 ml. per minute at S.T.P. in admixture with 4.5 times its volume of hydrogen was introduced into inlet 45 of FIG. 4 and the diethyldiborane at the rate of 50 ml. per minute at S.T.P. diluted with 9.0 times its volume of hydrogen was introduced into sparger tube 41 of FIG. 4. The second step was carried out for a period of 386 minutes while the temperature in the reactor of FIG. 4 was maintained between 203 and 218° C. to produce 6.7 grams of liquid product. The reaction proceeded smoothly without fogging, but did produce some yellow solids and a white crystalline material resembling decaborane. The liquid reaction product was fractionated into two portions, collected at −78° C. and −130° C. respectively. The −78° C. fraction was found by infrared analysis to contain a considerable amount of pentaborane and a small amount of diborane, some tetraborane and a mixture of ethyldiboranes. The −130° C. fraction was found by infrared analysis to be mostly monoethyldiborane with a small amount of diborane and some unknown material. Fraction collected at −78° C. was allowed to warm to 0° C., the volatile material was transferred and a small quantity of slightly volatile liquid (vapor pressure 20 mm. at 0° C.) remained. Infrared analysis of this slightly volatile liquid showed carbon-hydrogen and boron-hydrogen bonds but no bridge hydrogen and no band in the usual position described the boron-carbon bonds. The liquid contained 53 percent boron.

EXAMPLE XIII

In this experiment, a tandem reactor system consisting of two sparger-type reactors was employed (see FIG. 6). The apparatus essentially comprised a first reactor 61 and a second reactor 62, each of which was jacketed and heater by means of hot oil. Manifold 63 served for the introduction of a mixture of ethylene and hydrogen and manifold 64 for the introduction of a mixture of hydrogen and diborane into reactor 61. Manifold 65 served for the introduction of additional quantities of diborane into the reaction system. Each reactor was provided with a thermowell and thermocouple 66. Product trap 67 was maintained at −78° C.

The apparatus was vacuum tested for leaks and then brought to atmospheric pressure and flushed with hydrogen and nitrogen. The initial temperature of the first reactor was 146° C. while the initial temperature of the second reactor was 243° C. The reactors were heated to operating temperature by circulation of hot silicone oil through the reactor jackets. The input of hydrogen to both of the diborane and ethylene manifolds 63 and 64 was adjusted at 315 ml. per minute at S.T.P. and the ethylene input was set at 60 ml. per minute at S.T.P. Then diborane, at the rate of 10 ml. per minute at S.T.P., was passed into the first reactor and about 30 seconds later a white fog became visible below the second reactor. After 2 minutes 280 ml. per minute at S.T.P. of diborane were fed into the second reactor through manifold 65. The temperature of the second reactor rose quickly after the introduction of diborane to about 6° C. above the initial opening temperature and then returned to initial conditions while the temperature of the first reactor required about 19 minutes to increase by this amount. Fog was visible throughout the reaction and yellow viscous liquid and solids were observed below the second reactor. During the reaction period the temperature of the first reactor varied between 146° and 152° C. while the temperature of the second reactor varied between 243° and 249° C. The time of the reaction was 63 minutes. For the first reactor the residence time employed was 9 seconds and for the second reactor the residence time was 7 seconds. When the experiment had been concluded, the system was swept with nitrogen and hydrogen. The product was weighed after being cooled to −196° C. and subsequently allowed to warm to room temperature overnight while open to a mercury-sealed vent.

Analysis of this stable crude product showed that it contained 44 percent boron. The remaining crude material was subjected to reduced pressure to remove the more volatile constituents and by infrared analysis was found to be a mixture of ethyldiboranes, pentaborane and ethylpentaboranes. The low volatile material had a vapor pressure of 8 mm. at 0° C., was centrifuged, and found to contain 51 percent boron.

During this experiment 4.95 g. of stable crude product were prepared which corresponds to an uncorrected yield of 18 percent. During this same reaction 1.3 g. of low volatile liquid was prepared which corresponds to an uncorrected yield of 5.2 percent.

EXAMPLE XIV

The apparatus employed in carrying out this experiment consisted of a reactor of the type shown in FIG. 4 followed by a reactor of the type shown in FIG. 3. The outlet of the first reactor was connected directly to the second reactor by means of glass tubing heated by means of an asbestos heating tape. The second reactor was followed by a large spiral trap cooled to −78° C. in which the product was collected.

The first reactor was brought to an operating temperature of 134° C. and the second reactor was brought to an operating temperature of 252° C. by the circulation of hot silicone oil through the jackets of the respective reactors. Ethylene at the rate of 180 ml. per minute at S.T.P. and hydrogen at the rate of 270 ml. per minute at S.T.P. were mixed together and passed into the first reactor through the sparger tube. Diborane at the rate of 30 ml. per minute at S.T.P. and hydrogen at the rate of 270 ml. per minute at S.T.P. were mixed together and passed into the annular space of the first reactor. The effluent from the first reactor was passed into the second reactor through inlet 39 (not FIG. 3). Diborane at the rate of 240 ml. per minute at S.T.P. was introduced into the reaction zone of the second reactor through line 36 (see FIG. 3).

During the course of the experiment, which continued for 100 minutes, the temperature of the first reactor varied between 139 and 141° C. while the temperature of the second reactor varied between 204 and 225° C. The product obtained in the −78° C. trap was cooled to −196° C. and then allowed to warm to room temperature overnight while open to a mercury-sealed vent. A total of 15.2 g. of stable crude material containing 37.9 percent boron was obtained. The uncorrected yield, based on the weight of diborane consumed, was 27.2 percent. Before sampling, the stable crude was centrifuged.

The remaining crude material was subjected to reduced pressure to remove the more volatile constituents. The low volatile material, which has a vapor pressure of 5 mm. at 0° C., was shown by analysis to contain 41.7 percent boron.

EXAMPLE XV

In this experiment a mixture of ethylene and acetylene with hydrogen as a diluent, were reacted with diborane in a vertical glass tube.

The reactor used in this experiment consisted of a vertical glass tube (½ inch by 8 inches) heated by means of oil circulating through a jacket. A double manifold was attached to the upper end of the reactor. Diborane and hydrogen, measured by individual flowmeters, were mixed in one arm of the manifold and acetylene, ethylene and hydrogen, measured by individual rotameters, in the other. The two gas streams were brought together at the top of the heated portion of the reactor.

A trap cooled by a mixture of Dry Ice and trichloroethylene to −78° C. was attached to the lower end of the reactor to collect the product. A safety manometer (bubble-off) was connected to this trap. The entire system was maintained in an inert atmosphere (nitrogen) at all times. A thermocouple in a glass well about 2 inches below the point of entry of the gases was used to measure the temperature in the reactor. The temperature of the circulating oil was measured by a thermometer immersed in the oil reservoir.

The reactor was brought to operating temperature by circulating oil through the jacket until the jacket temperature reached 130° C. Then diborane and hydrogen were mixed together after being measured in individual rotameters and passed into the reactor. Ethylene and hydrogen were measured by individual rotameters, mixed together and passed into the reactor. The formation of a white cloud indicated that the reaction had started.

Acetylene was introduced into the ethylene-hydrogen stream and the flow of ethylene and accompanying hydrogen was reduced until the ratio of the gases was one volume of diborane to 1.2 of hydrogen, 0.4 of ethylene and 0.4 of acetylene. The reaction was allowed to proceed for about one-half hour during which time the oil temperature was maintained at 130–140° C. The temperature inside the reactor rose to a maximum of 240° C. The reactor exit tube became clogged with solid products at the end of this time and the reaction was discontinued.

The trap with the products was maintained at −78° C. while dissolved gases were removed by evacuation. About 10 ml. of liquid, mixed with solids, remained in the trap. This product was allowed to warm to room temperature and about 2 ml. of the volatile liquid which had a vapor pressure of 32 mm. at 0° C. was transferred, under vacuum, to a second trap cooled with liquid nitrogen. Analysis of this fraction revealed that it contained 20.4 percent boron. The remainder of the liquid was removed from the solid by centrifugation and was found to contain 24.8 percent boron by analysis. The products were light yellow liquids containing yellow to brown solids.

EXAMPLE XVI

Propylene as well as ethylene can be reacted successfully with borane in both single reactors as well as in tandem reactor systems.

The reaction described in this example was carried out in a two-stage reactor system as described in Example XIV. The first reactor was connected to the second reactor so that the reaction products of the first reactor entered inlet 39 (FIG. 3) of the second reactor. The reactors were brought to operating temperature by circulation of hot oil through the reactor jackets. At the start of the reaction the first reactor was brought to a temperature of 154° C. at the start of the reaction while the second reactor was brought to a temperature of 261° C. Two spiral traps and a Nujol-sealed vent were attached to the series after the second reactor. The product traps were cooled to −78° C. with constant temperature baths containing a mixture of Dry Ice in trichloroethylene. After evacuation of the system it was filled with nitrogen under pressure which was released gradually. This was repeated after which the nitrogen was permitted to pass directly through the reactors by means of the proper control valves.

When the reactors had attained desired reaction temperatures and all lines had been flushed, propylene at the rate of 120 ml. per minute at S.T.P. and hydrogen, at the rate of 630 ml. per minute at S.T.P., were measured in individual rotameters, mixed together, and passed into the sparger tube of the first reactor. Diborane was metered through an individual rotameter and passed into the annular space of the first reactor at the rate of 20 ml. per minute at S.T.P. After about 30 seconds, diborane, metered through an individual rotameter, was passed into line 36 of the second reactor at the rate of 560 ml. per minute at S.T.P. along with 630 ml. per minute at S.T.P. of hydrogen. The temperature of both reactors rose after several minutes and a white fog began to pass through the traps. During the entire reaction the temperature of the first reactor varied between 154° and 157° C. while the temperature of the second reactor varied between 261° and 269° C. Yellow solids accumulated below the reactor after 15 minutes and became quite dense, turning from a light yellow to a dark brown color. The reaction was continued for 60 minutes.

After the reaction had been completed, nitrogen was then passed directly to the reactors for an hour or more. The spiral traps were removed and attached to a manifold opened to a slight nitrogen pressure and to a mercury-sealed vent after which the product was allowed to warm slowly to room temperature overnight. A sample of the degassed liquid was removed for boron analysis and centrifuged to free brown traces of solid; the remainder was decanted and stored. The spiral traps were weighed again to obtain the weight of the solids which accumulated during the reaction. The centrifuged sample of degassed liquid (crude product) was found to contain 50 percent boron.

A portion of the decanted liquid product was transferred to another trap to be degassed with a vacuum pump for evaluation of the low volatile constituents. Samples of the vapors removed during the process of degassing the liquid product to a low vapor pressure were found by infrared analysis to contain propyldiborane and pentaborane. When the low volatile product had attained a vapor pressure of 6 mm. at 0° C., a sample of the liquid was centrifuged and, upon analysis, was found to contain 43 percent boron.

The residence time of the first reactor was 6.3 seconds while the residence time of the second reactor was 14.5 seconds. A total of 9.3 g. of stable liquid product, which corresponds to an uncorrected yield of 15.7 percent, based on the diborane consumed, was obtained in this reaction.

EXAMPLE XVII

In this example, the two-reactor system of Example XIV was employed.

In this particular experiment, the heated zone of the second reactor was packed with 71.5 grams of silver wool. The first reactor was connected to the second reactor in such manner that the reaction products of the first reactor enteerd line 39 (FIG. 3). Diborane was introduced into the second reactor through line 36 (FIG. 3). The first reactor was brought to reaction temperature of 170° C. and the second reactor to a reaction temperature of 250° C. by the circulation of hot oil through the respective reactor jackets. At the same time hydrogen and nitrogen gas were passed through the reactors at the rate used during the experiment. At the beginning of the reaction the nitrogen flow was stopped and diborane, metered through a rotameter, at the rate of 20 cc. per minute at S.T.P., was passed into the annular space of the first reactor along with 630 cc. per minute at S.T.P. of hydrogen which was metered through a rotameter. Next, diborane was metered into the second reactor through a rotameter at the rate of 560 cc. per minute at S.T.P. and finally, 120 cc. per minute at S.T.P. of propylene, along with 630 cc. per minute of hydrogen at S.T.P., were individually metered, mixed together, and passed into the sparger reactor through the sparger tube inlet. A constant hydrogen flow was maintained to each reactor both before, during, and after the reaction. From the second reactor the products were passed through a large, 500 ml. bulb trap which was maintained at room temperature in order to collect the low volatile products. From the bulb trap the reaction mixture was led into a spiral inlet, 500 ml. trap, cooled with a Dry Ice-trichloroethylene mixture. The bulk of the product retained in this trap. After degassing at room temperature overnight, this product was designated as the −78° C. trap product. The reaction time for this particular experiment was 39 minutes.

In the room temperature trap 4.01 g. of yellow liquid, which contained a trace of solids, was collected. The product collected in the trap maintained at −78° C. weighed 11.97 g. after being degassed overnight at room temperature. The products collected in both traps were studied by infrared analysis and mass spectrometry. Analysis by these methods showed that decaborane, propylpentaborane, dipropylpentaborane, propyldiboranes, pentaborane, and propylpentaborane were present in these products. Yield based on the diborane input was 57 percent. The boron analysis of the various products, as well as additional information concerning the reaction, are tabulated in Table I. It is significant in this case to note that in this experiment solids formation was almost completely eliminated, especially in the reactors and in the room temperature trap. The yield of usable product also was greatly increased.

EXAMPLE XVIII

In this experiment diborane and propylene were reacted in the sparger-conical reactor system. The equipment used in this experiment was identical with that utilized in Example XIV with the exception that 64.5 g. of platinized copper turnings were used as packing in the conical reactor.

A reaction temperature of 168° C. was maintained in the sparger reactor and a reaction temperature of 198° to 199° C. was maintained in the conical reactor during this experiment. Essentially the same experimental procedure was used in this experiment as was described in Example XVII, see Table I. The experimental data are presented in Table I.

During the first 10 minutes of the reaction, copious quantities of crystalline decaborane were observed on the walls of the room temperature trap. After a few minutes of operation these decaborane crystals began to dissolve in the liquid product condensing on the walls of this trap. This experiment was allowed to continue for 60 minutes. By analysis it was shown that the product retained in the room temperature trap contained 53.4 percent boron while that retained in the −78° C. trap contained 45.3 percent boron.

EXAMPLE XIX

This experiment was carried out similarly to Example XVIII, using a nickel distillation packing in the conical reactor. The experimental details are tabulated in Table I below.

EXAMPLE XX

The reactor (FIG. 7) 71 in this experiment had an inside diameter of 2½ inches, a length of 15 inches and a volume of 650 ml. The reaction zone was heated by

*Table I*

| Example | First Reactor [1] | | | | | | Second Reactor [2] | | | | Packing |
|---|---|---|---|---|---|---|---|---|---|---|---|
| | $H_2$, ml./min., S.T.P. | $B_2H_6$, ml./min., S.T.P. | $C_3H_6$, ml./min., S.T.P. | T., °C. | Oil Bath, T., °C. | Residence Time, sec. | $B_2H_6$, ml./min., S.T.P. | T., °C. | Oil Bath, T., °C. | Residence Time, sec. S.T.P. | |
| XVII | 1,260 | 20 | 120 | 145 | 171 | 6.4 | 560 | 232–235 | 250 | 13.0 | 71.9 g. Silver Wool. |
| XVIII | 600 | 240 | 120 | 168 | 181 | 9.3 | 340 | 193–219 | 215 | 19.6 | 64.5 g. Platinized Copper Turnings. |
| XIX | 800 | 240 | 120 | 156–158 | 176 | 7.6 | 340 | 198–201 | 215 | 17.0 | 71.5 g. Nickel Distillation Packings. |

See footnotes at end of table continued on next page.

Table I—Continued

| Example | 25° C. Trap | | | | −78° C. Trap [3] | | | Total Yield,[4] Weight Percent |
|---|---|---|---|---|---|---|---|---|
| | Total $B_2H_6$ Input, g./hr. | G./hr. | Boron, Percent | Identification | G./hr. | Boron, Percent | Identification | |
| XVII | 43.0 | [5] 6.16 | | Propylpentaborane: Pentaborane =2:1 Propyldiboranes Trace dipropylpentaborane. | [5] 18.4 | 48.2 | Propyldiboranes Pentaborane: Propylpentaborane=4:1. | 57.0 |
| XVIII | 43.0 | [6] 2.53 | 53.4 | Deca-, Alkylpenta-, alkyldiboranes. | [5] 24.35 | 45.3 | Pentaborane: Propylpentaborane =5:1. | 62.6 |
| XIX | 43.0 | [7] 1.85 | 54.7 | Decaborane, alkylated decaborane pentaborane, alkylated Pentaborane. | 24.10 | 44.6 | Pentaborane: Propylpentaborane =5:1. | 60.5 |

[1] Volume=140 ml.
[2] Heated volume=425 ml.
[3] Product degassed at room temperature overnight before weighing.
[4] Yields are uncorrected yields based on a single pass and on weight percent of diborane throughput.
[5] Trace Solids.
[6] No Solids Decaborane Crystallizes.
[7] No Solids.

hot silicone oil which was circulated through an external jacket 72 and an internal heating tube 73. A fritted glass plug 74 served to introduce propylene to the reactor through line 75, while diborane was passed into the top of the reactor through line 76. Two spiral traps (not shown) of 500 ml. capacity were utilized to collect the liquid produces from the reactor. The reactor was heated to 109° C. while nitrogen and hydrogen were passed through it. Hydrogen was passed through line 76 into the top of the reactor at the rate of 160 cc. per minute at S.T.P. and also through line 75 at the rate of 640 cc. per minute at S.T.P. When the desired temperature was reached the flow of nitrogen was stopped and the propylene, metered through a rotameter, at the rate of 80 cc. per minute at S.T.P., was introduced through the porous plug. Next, diborane, metered through a rotameter, was admitted into the reactor top at the rate of 800 cc. per minute at S.T.P. Flow rates were adjusted so that the flow of hydrogen and propylene through the fritted glass plug were 640 ml. per minute and 80 ml. per minute, respectively, and those of hydrogen and diborane into the top of the reactor were 160 ml. per minute and 800 ml. per minute, respectively.

The start of the reaction was evidenced by a white fog which formed in the reactor and was carried over into the traps. From the reactor, the reaction mixture was passed through two spiral traps which were cooled to −78° C. by means of a trichloroethylene-Dry Ice mixture. The temperature of the reactor during the experiment varied between 182° and 194° C. The residence time for this experiment was 23 seconds. Reaction was continued for three hours.

The majority of the product was collected in the first trap. Both traps were allowed to warm to room temperature overnight during which time the volatile products were allowed to escape through a Nujol-filled safety vent. The yield of degassed product was 31 percent based on the diborane input. By analysis, this product was shown to contain 52.15 percent boron.

Analysis of the product by means of mass spectrometer showed that it contained propyldiboranes, pentaborane and propylpentaborane.

EXAMPLE XXI

In this experiment, diborane and ethylene were reacted in the presence of hydrogen at a temperature of 126–134° C. The molar ratio of hydrogen to diborane to ethylene in the entering gases was 3:1:1, respectively. Actual flow of gases to the reactor was 150 ml. of hydrogen per minute, 50 ml. of diborne per minute and 50 ml. of ethylene per minute. The reactor used had an inner jacket of 20 mm. tubing and an outer jacket of 28 mm. tubing, was two inches long, had a 21 ml. capacity and was heated by circulating hot oil between the inner and the outer jackets. The ethylene was admitted into the reactor through a single tube at the top into an atmosphere of diborane and hydrogen which was provided by introducing the diborane and hydrogen in admixture with each other at an intermediate point down the reactor. The hydrogen used in this experiment was passed over a deoxidizing catalyst and then over a drier to remove any water that might have been formed. The other gases were used directly from the cylinder.

The reaction proceeded instantaneously as evidenced by the presence of a white cloud. After about 30 minutes some solid products were noticed inside the reactor. The reaction was carried out over a period of 40 minutes. The ethylene-diborane product was collected in a −78° C. trap and the off-gases were then passed through a liquid nitrogen trap where they were condensed. During the experiment 3.77 grams of bulk product was collected in the −78° trap. This corresponds to an uncorrected yield of 47%. The material collected in the trap (liquid nitrogen) was fractionated into two fractions. Fraction 1, which was collected in the −196° liquid nitrogen trap, consisted of ethylene and diborane. Analysis of this fraction by infrared and subsequent calculations indicated at least a 65 percent conversion of both gases. Fraction 2 was collected in a −78° trap and about 0.470 grams of ethyl diborane was obtained.

EXAMPLE XXII

In this experiment the reactor used was of the type shown in FIG. 4. The actual ration of hydrogen to diborane to ethylene was 10:1:2 which corresponds to an actual flow of 900 ml. of hydrogen, 90 ml. of diborane and 180 ml. of ethylene/min. The initial temperature in the reactor was 126° C. and as the reaction progressed the temperature rose to 134°. No solid materials were noticed in the reactor as this reaction was carried out. Colorless liquid was produced. The hydrogen used in this experiment was passed through the usual deoxidizing unit and then through a dryer. The hydrogen stream was split and one-half of the added hydrogen was introduced with the diborane stream and one-half of the hydrogen with the ethylene stream. The diborane and ethylene were used as obtained from the cylinders. The run was carried out for a period of 33 minutes. The products of the reaction were trapped in a −78° trap.

A weighed amount of the more volatile material from the bulk product was removed by expanding it into the vacuum system. Then the molecular weight was determined on this sample and the sample hydrolyzed with methanol to determine the active hydrogen (ml. of hydrogen evolved per ml. of sample). From sample 1 a molecular weight of 58.4 was determined with an active hydrogen of 4.90. These figures show that this mixture was predominately ethyldiborane with a small amount of diethyldiborane. Sample 2, obtained in the same manner as sample 1, had a molecular weight of 53.8 which shows that this material was predominately ethyldiborane. Sample 3 had a molecular weight of 74.5 with an active hydrogen of 4.41. In this particular fraction the boron was analyzed and found to be 29.2 percent. This material corresponds to a mixture of 67.5 percent diethyldiborane and 32.5 percent ethyldiborane. Sample 4 was found to have a molecular weight of 78.1 with an active hydrogen of 4.37. The boron in this material was determined by analysis and found to be 27.2 percent.

EXAMPLE XXIII

In this example, diborane was reacted with ethylene or propylene using the two-sparger reactor system of Example XIII or the sparger-conical reactor system of Example XIV.

A typical procedure used is as follows (Experiment D). The oil for the reactors was circulated at the desired temperatures. Two spiral traps and a Nujol-sealed vent were attached in series after the conical reactor and the system was vacuum tested and then flushed with nitrogen and hydrogen. The product traps were cooled to −78° C. with constant-temperature baths of Dry Ice in trichloroethylene. A weighed diborane cylinder was attached to the high-pressure manifold. Nitrogen was introduced at full tank pressure and then released gradually from the manifold through a system which permitted a moderate flow of gas through a rotameter and mercury-sealed vent. After evacuation of the system it was filled again with nitrogen under pressure which was released gradually. This was repeated a third time after which the nitrogen was permitted to pass directly through the reactors by means of the proper control valves. When the reactors had attained desired reaction temperatures and all lines had been flushed, the flow rates for hydrogen (630 ml. per minute in both the sparger and conical reactors) and propylene (120 ml. per minute) were adjusted. Then diborane was passed through the sparger reactor at a rate of 20 ml. per minute and after about 30 seconds into the conical reactor at a rate of 560 ml. per minute. The temperature of both reactors rose after several minutes when a white fog began to pass through the traps. Yellow solids accumulated below the reactor after 15 minutes and became quite dense, turning from a light yellow to a dark brown color. The temperatures of both reactors dropped a few degrees after the initial rise. The temperature of the sparger reactor varied from 154 to 157° C. and of the conical reactor varied from 261 to 269° C. The reaction was continued for sixty minutes.

After the reaction was terminated, the diborane cylinder was shut off. The system was then evacuated and then pressurized with nitrogen and evacuated again. Then nitrogen was passed directly into the reactors for an hour or more. The spiral traps were removed and attached to a manifold open to a slight nitrogen pressure and to a mercury-sealed vent after which the product was allowed to warm slowly to room temperature overnight. A sample of the degassed liquid was removed for boron analysis and centrifuged to free brown traces of solids. The remainder was decanted and stored. The spiral traps were weighed again to obtain the weight of solids accumulated during the reaction. The centrifuged sample of degassed liquid (crude product) was found to contain 50 percent boron.

A portion of the decanted liquid product was transferred to another trap to be degassed with a vacuum pump for evaluation of the low volatile constituents. Samples of the vapors removed during the process of degassing the liquid product to a low vapor pressure were found by infrared analysis to contain propyldiboranes and pentaborane-9. When the low-volatile product had attained a vapor pressure of 6 mm. at 0° C., a sample of the liquid was centrifuged and upon analysis was found to contain 43 percent boron.

The experimental conditions and results of this series of experiments is shown in Table II.

Table II

| Experiment No. | $H_2$, ml./min. | Input Ratios | | | | | Total Input | | Temperature of Reactors, ° C. | | Res. Time of Reactors (sec.) | |
|---|---|---|---|---|---|---|---|---|---|---|---|---|
| | | Reactors (ml./min.) | | Total, g./hr. | Hydrocarbon, ml./min. | | $B_2H_6$, g. | Hydrocarbon, g. | | | | |
| | | 1st | 2nd | | $C_2H_4$ | $C_3H_6$ | | | 1st | 2nd | 1st | 2nd |
| A | 1,800 | 600 | 600 | 83.7 | 300 | ---------- | 60 | 16.1 | 137–145 | 218–219 | 3.3 | 8.2 |
| B | 630 | 10 | 280 | 35 | ---------- | 60 | 38 | 7.7 | 145–160 | 250–254 | 9.3 | 6.9 |
| C | 450 | 25 | 125 | 18 | ---------- | 150 | 18 | 17.4 | 145–158 | 251–266 | 10.4 | 10.4 |
| D | 1,260 | 20 | 560 | 43 | ---------- | 120 | 43 | 16 | 154–157 | 261–269 | 6.3 | 14.5 |
| E | 300 | 25 | 125 | 12 | ---------- | 150 | 12 | 18 | 138–142 | 248–266 | 18.6 | 56.8 |

| Experiment No. | Reaction Time (min.) | Stable Liquid Product Yield | | | G. $B_2H_6$/ g. liq. Product | Solid Formation Yield | | Low[1] Volatile Liquid Product | | | Reaction System |
|---|---|---|---|---|---|---|---|---|---|---|---|
| | | G./hr. | Unc., Percent | Percent B | | G./hr. | Unc., Percent | G./hr. | Unc., Percent | Percent B | |
| A | 43 | 18.1 | 17 | 44.50 / 44.65 | 4.61 | 6.9 | 6.5 | ---------- | ---------- | ---------- | Ex. XIV. |
| B | 66 | 4.6 | 10 | 32.25 / 32.20 | 8.26 | ---------- | ---------- | ---------- | ---------- | 29.97 / 30.24 | Ex. XIII.[2] |
| C | 60 | 20.15 | 56.9 | 25.82 / 25.25 | 0.89 | 2.3 | 6.4 | 14.3 | 39.7 | 23.18 / 23.37 | Ex. XIII.[2] |
| D | 60 | 9.3 | 15.7 | 50.41 / 50.77 | 4.73 | 13 | 22 | ---------- | ---------- | 43.37 / 43.69 | Ex. XIV.[3] |
| E | 60 | 14 | 46.6 | 23.71 / 23.71 | 0.85 | 5 | 166 | 7.34 | 24.4 | 26.75 / 26.53 | Ex. XIII.[2] |

[1] Liquid with a vapor pressure less than 5 mm. at 0° C.
[2] Product is mainly propyldiborane with some pentaborane-9.
[3] Product is mainly propyldiborane and pentaborane-9.

The compositions prepared in accordance with this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products produced in accordance with this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products produced in accordance with this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon produced in accordance with the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocrabons before entrance into the turbine section. For the higher energy fuels produced in accordance with the present invention, the local fuel to air ratio in the zone of fuel injection should also be approximately stoichiometric, assuming that the boron, carbon and hydrogen present in the products burn to boric oxide, carbon dioxide and water vapor. In the case of monoethyldiborane, for example, this local fuel to air ratio by weight is approximately 0.068. For the higher energy fuels produced in accordance with this invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products produced in accordance with this invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of boron hydrocarbon produced in accordance with the present invention and hydrocarbon fuel present in the mixture, and consistent with the air dilution required to maintain the gas temperatures of these mixtures within accepted turbine operating temperatures.

Because of their high chemical reactivity and heating values, the products of our invention can be employed as fuels in ramjet engines and in afterburning and other auxiliary burning schemes for the turbojet and bypass or ducted type engines. The operating conditions of afterburning or auxiliary burning schemes are usually more critical at high altitudes, than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products produced in accordance with this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products produced in accordance with this invention eliminates the need of flameholding devices within the combustion zone of the afterburner. When employed in an afterburner, the fuels produced in accordance with the present invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products produced in accordance with this invention will improve the combustion process of the ramjet in much the same manner as that described for the afterburner because of their improved chemical reactivity over that of the simple hydrocarbon fuels. When employed in a ramjet the fuels of the present invention will be simply substituted for hydrocarbon fuels and used in the established manner.

We claim:

1. A method for the production of a liquid borohydrocarbon which comprises reacting diborane and an unsaturated hydrocarbon selected from the group consisting of ethylene, propylene and acetylene and mixtures thereof at 130–300° C. in vapor phase while the reactants are in admixture with a diluent gas, the molar ratio of unsaturated hydrocarbon to diborane being within the range from 1:10 to 10:1, the diluent gas comprising from 20 to 60 percent by volume of the reaction mixture and the volume of acetylene not exceeding 60 percent of the total volume of the unsaturated hydrocarbon.

2. The method of claim 1 wherein said unsaturated hydrocarbon is ethylene.

3. The method of claim 1 wherein said unsaturated hydrocarbon is propylene.

4. A method for the production of a liquid borohydrocarbon which comprises reacting diborane and an unsaturated hydrocarbon selected from the group consisting of ethylene, propylene and acetylene and mixtures thereof at 150–250° C. in vapor phase while the reactants are in admixture with a diluent gas, the molar ratio of unsaturated hydrocarbon to diborane being within the range from 1:8 to 1:2, the diluent gas comprising from 20 to 60 percent by volume of the reaction mixture and the volume of acetylene not exceeding 60 percent of the total volume of the unsaturated hydrocarbon.

5. The method of claim 4 wherein said unsaturated hydrocarbon is ethylene.

6. The method of claim 4 wherein said unsaturated hydrocarbon is propylene.

7. A method of preparing a liquid borohydrocarbon fuel which comprises reacting diborane and ethylene within the temperature rage of 130° C. to 275° C. while the reactants are in admixture with an inert diluent gas in an amount equivalent to between about 20 and 60 percent by volume of the resulting reaction mixture, the molar ratio of diborane to ethylene being greater than 1:1.

References Cited by the Examiner

Whatley et al., J. Amer. Chemical Society, vol. 76 (1954), pages 835 to 838.

TOBIAS E. LEVOW, *Primary Examiner.*

WILLIAM G. WILES, *Examiner.*